(12) United States Patent
Greenwood et al.

(10) Patent No.: US 10,401,127 B2
(45) Date of Patent: *Sep. 3, 2019

(54) GUNNER ACCESSORY PACKAGE

(71) Applicant: Black Mountain Industries, Inc., College Station, TX (US)

(72) Inventors: Kyle L. Greenwood, College Station, TX (US); Devin Gerland, College Station, TX (US)

(73) Assignee: Black Mountain Industries, Inc., College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,456

(22) Filed: Sep. 10, 2015

(65) Prior Publication Data

US 2015/0377594 A1     Dec. 31, 2015

Related U.S. Application Data

(63) Continuation of application No. 13/250,852, filed on Sep. 30, 2011, now Pat. No. 9,163,908.

(51) Int. Cl.
| | |
|---|---|
| *F41H 5/20* | (2006.01) |
| *B60R 21/04* | (2006.01) |
| *F41H 7/04* | (2006.01) |
| *F41H 7/02* | (2006.01) |
| *B63G 9/00* | (2006.01) |
| *B64D 7/00* | (2006.01) |

(52) U.S. Cl.
CPC ................. *F41H 7/02* (2013.01); *F41H 5/20* (2013.01); *F41H 7/04* (2013.01); *F41H 7/046* (2013.01); *B63G 9/00* (2013.01); *B64D 7/00* (2013.01)

(58) Field of Classification Search
CPC .......... F42D 5/05; F41H 5/0492; B60R 21/04
USPC ........... 89/36.07, 36.08, 36.05, 36.02; 2/2.5; 296/187.07, 190.03; 280/748, 749, 752
See application file for complete search history.

(56) References Cited

U.S. PATENT DOCUMENTS

| | | |
|---|---|---|
| 1,027,764 A | 5/1912 | Rilleau |
| 1,324,234 A | 12/1919 | Daigre |
| 1,589,517 A | 6/1926 | Desmarquoy |
| 2,332,357 A | 10/1943 | Uffelman |
| 2,436,461 A | 2/1948 | Tritt et al. |

(Continued)

FOREIGN PATENT DOCUMENTS

| | | |
|---|---|---|
| GB | 173079 A | 12/1921 |
| WO | 2008/109069 A1 | 9/2008 |
| WO | 2008/109140 A1 | 9/2008 |

OTHER PUBLICATIONS

USPTO Office Action for U.S. Appl. No. 13/364,234 dated Nov. 9, 2015.

(Continued)

*Primary Examiner* — Reginald S Tillman, Jr.
(74) *Attorney, Agent, or Firm* — Tumey L.L.P.

(57) ABSTRACT

A protected firing platform protection system protects personnel from contact with the protected firing platform. In an embodiment, the protected firing platform protection system is adapted for use with a protected firing platform of a military vehicle. The protected firing platform protection system includes a blanket. The blanket has a carrier and a protective insert. The carrier has an interior. The protective insert is disposed in the interior. The blanket is attached to the protected firing platform.

16 Claims, 4 Drawing Sheets

(56) References Cited

U.S. PATENT DOCUMENTS

| | | | |
|---|---|---|---|
| 2,606,755 A | | 8/1952 | Samuels |
| 2,626,163 A | | 1/1953 | Scantlebury |
| 2,820,648 A | | 1/1958 | Wanzenberg |
| 3,091,551 A | | 5/1963 | Robertson |
| 3,224,924 A | | 12/1965 | Von Ardenne Manfred et al. |
| 3,491,847 A | | 1/1970 | Abbott |
| 3,648,613 A | | 3/1972 | Cunn |
| 3,657,036 A | | 4/1972 | Mullenhoff |
| 3,801,416 A | | 4/1974 | Gulbierz |
| 3,843,155 A | | 10/1974 | Foster |
| 4,017,656 A | | 4/1977 | Lasman |
| 4,287,621 A | | 9/1981 | Kertz |
| 4,316,404 A | | 2/1982 | Medlin |
| 4,693,166 A | | 9/1987 | Pehker et al. |
| 4,751,774 A | | 6/1988 | DeYoung |
| 4,828,287 A | | 5/1989 | Siler |
| 4,874,648 A | | 10/1989 | Hill |
| 4,915,998 A | | 4/1990 | Parenti et al. |
| 4,955,095 A | * | 9/1990 | Gerrick ............... A47C 31/105 5/691 |
| 5,065,688 A | | 11/1991 | Moody |
| 5,087,511 A | | 2/1992 | Locey |
| 5,448,938 A | | 9/1995 | Fernandez et al. |
| 5,460,409 A | | 10/1995 | Conner |
| 5,589,243 A | | 12/1996 | Day |
| 5,722,729 A | | 3/1998 | Carilli |
| 5,939,658 A | | 8/1999 | Muller |
| 6,161,462 A | | 12/2000 | Michaelson |
| 6,175,958 B1 | | 1/2001 | Wu |
| 6,237,171 B1 | * | 5/2001 | Allen ................... A47G 9/0207 5/482 |
| 6,405,909 B1 | | 6/2002 | Burnett et al. |
| 6,669,233 B2 | | 12/2003 | Gabriel |
| 6,696,128 B2 | | 2/2004 | McIntee et al. |
| 6,807,890 B1 | * | 10/2004 | Fuqua ..................... F41H 5/08 89/36.02 |
| 6,823,548 B2 | * | 11/2004 | Murphy ............... A47C 31/001 5/698 |
| 6,878,437 B1 | | 4/2005 | Crane |
| 6,893,703 B2 | | 5/2005 | McIntee et al. |
| 6,899,009 B2 | * | 5/2005 | Christiansen ............ E06B 9/00 89/36.02 |
| 7,102,814 B1 | | 9/2006 | Hughes |
| 7,389,718 B1 | * | 6/2008 | Carter ..................... F41H 1/02 2/2.5 |
| 7,488,017 B2 | | 2/2009 | Lassl et al. |
| 9,163,908 B2 | * | 10/2015 | Greenwood ............. F41H 7/02 |
| 2005/0243331 A1 | | 11/2005 | Ishima et al. |
| 2005/0248180 A1 | | 11/2005 | Campo Barasoain |
| 2009/0139091 A1 | | 6/2009 | Tucker |
| 2010/0107861 A1 | | 5/2010 | Carter |
| 2011/0290105 A1 | | 12/2011 | Greenwood |
| 2013/0081533 A1 | | 4/2013 | Greenwood |

OTHER PUBLICATIONS

Supplementary European Search Report for Application No. EP 12 85 9560 dated Apr. 10, 2015.
USPTO Office Action for U.S. Appl. No. 13/364,234 dated Feb. 12, 2015.
Max-Grimloc Maxpedition Hard-Use Grimloc Carabiners. Product description (online). One Stop Knife Shop, May 9, 2007 (retrieved Feb. 19, 2014 from internet: www.onestopknifeshop.com/mazpedition-grimloc-carabiner.html).
Ammo Can Cover. Product description (online). Tactical Tailor, Dec. 4, 2010 (retrieved Feb. 20, 2014 from internet www.emgear.net/products/productpag.aspx?id=1369).
USPTO Non-Final Official Action for U.S. Appl. No. 13/364,234 dated Jul. 9, 2014.
USPTO Final Official Action for U.S. Appl. No. 13/364,234 dated Jun. 16, 2015.
International Preliminary Report and Written Opinion for International Application No. PCT/US2012/057962 dated May 22, 2014.
USPTO Office Action for U.S. Appl. No. 13/364,234 dated Mar. 19, 2013.
International Search Report and Written Opinion for International Application No. PCT/US2012/057962 dated Apr. 18, 2014.
USPTO Office Action for U.S. Appl. No. 13/250,852 dated Jun. 30, 2014.
USPTO Final Office Action for U.S. Appl. No. 13/250,852 dated Dec. 18, 2013.
USPTO Final Office Action for U.S. Appl. No. 13/250,852 dated Jan. 22, 2015.
USPTO Office Action for U.S. Appl. No. 13/250,852 dated Feb. 21, 2013.
USPTO Office Action for U.S. Appl. No. 13/364,234 dated Feb. 12, 2013.
USPTO Office Action for U.S. Appl. No. 13/364,234 dated Jul. 26, 2013.
USPTO Office Action for U.S. Appl. No. 13/250,852 dated Jun. 26, 2013.
USPTO Office Action for U.S. Appl. No. 13/250,852 dated Jul. 3, 2012.
USPTO Notice of Allowance for U.S. Appl. No. 13/250,852 dated Jul. 6, 2015.
USPTO Notice of Allowance for U.S. Appl. No. 13/364,234 dated May 4, 2016.
USPTO Final Office Action for U.S. Appl. No. 15/228,984 dated Jul. 30, 2018.
USPTO Non-final Office Action for U.S. Appl. No. 15/228,984 dated Nov. 5, 2018.

* cited by examiner

GUNNER ACCESSORY PACKAGE

CROSS-REFERENCE TO RELATED APPLICATIONS

This application is a continuation application of U.S. patent application Ser. No. 13/250,852 filed Sep. 30, 2011, which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

This invention relates to the field of military applications and more specifically to the field of contact protection systems for military personnel.

Background of the Invention

There is an increasing need for added protection for gunners and other personnel in gun turrets of military vehicles. Improvised explosive devices and other methods for attacking military vehicles have drawn added interest in the safety of gunners. Conventional methods for protecting gunners include reliance on the outer armor of the gun turret. Drawbacks to such conventional methods include instances in which force from the explosive devices enters the interior of the military vehicle or impacts against the side of the vehicle, or instances in which maneuvering of the vehicle to avoid a blast or other related obstacles may place the gunner at severe risk of injury or death. For instance, contact of the gunner against the sides of the gun turret may place the gunner at such risk.

Methods have been developed to overcome such drawbacks. For instance, reactive armor on the outside of the military vehicle and body armor worn by the gunner have been developed. Drawbacks to such developments also include risk of injury or death when the explosive forces enter the interior of the gun turret.

Consequently, there is a need for improved methods for protecting gunners in gun turrets of military vehicles from explosive forces.

BRIEF SUMMARY OF SOME OF THE PREFERRED EMBODIMENTS

These and other needs in the art are addressed in one embodiment by a protected firing platform protection system. The protected firing platform protection system is adapted for use with a protected firing platform (i.e., a turret) of a military vehicle. The protected firing platform protection system includes a blanket. The blanket has a carrier and a protective insert. The carrier has an interior. The protective insert is disposed in the interior. The blanket is attached to the protected firing platform.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
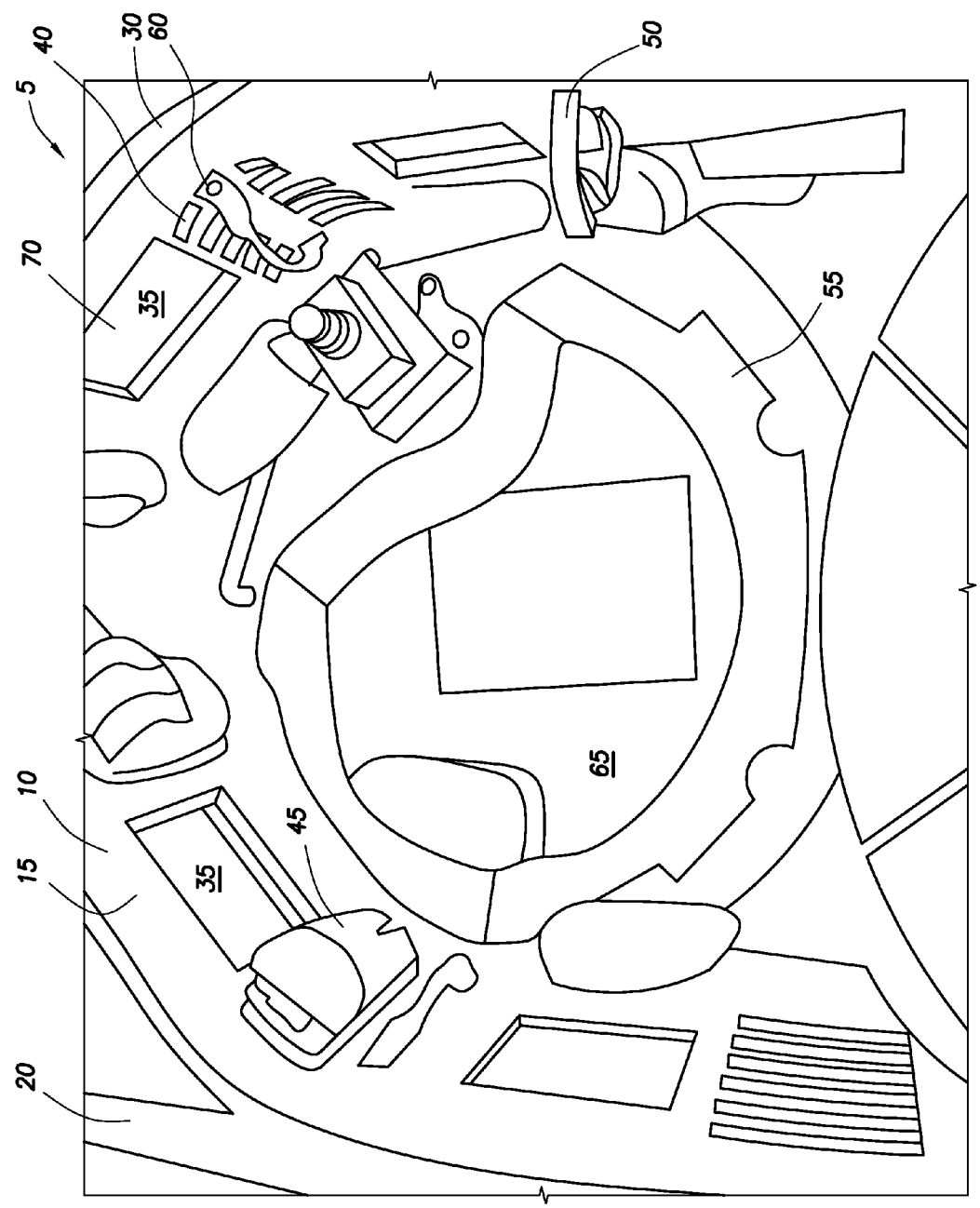
FIG. 1 illustrates a top view of an embodiment of a personnel protection system.
Figure 2:
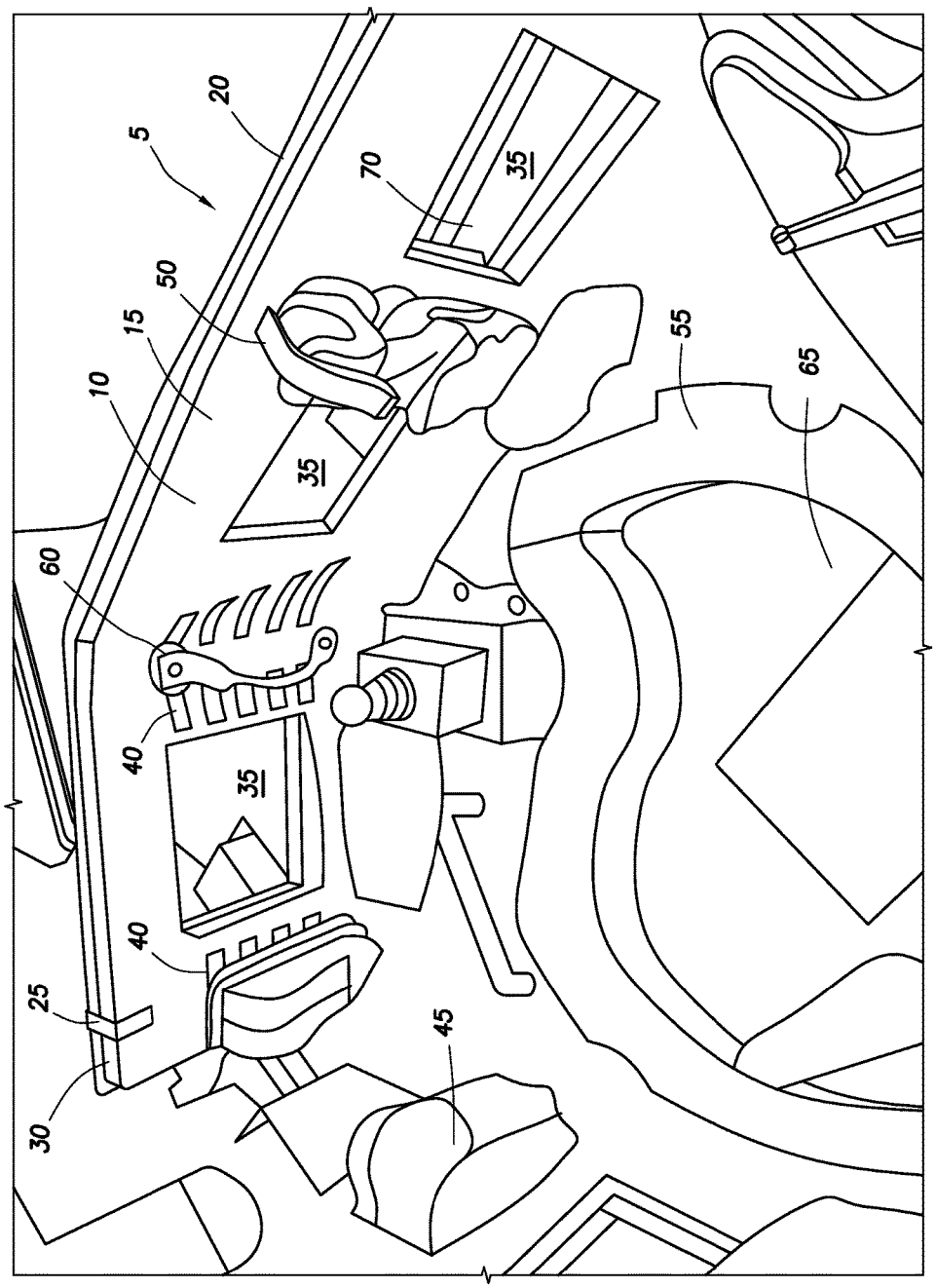
FIG. 2 illustrates a top perspective view of the personnel protection system shown in FIG. 1.
Figure 3:
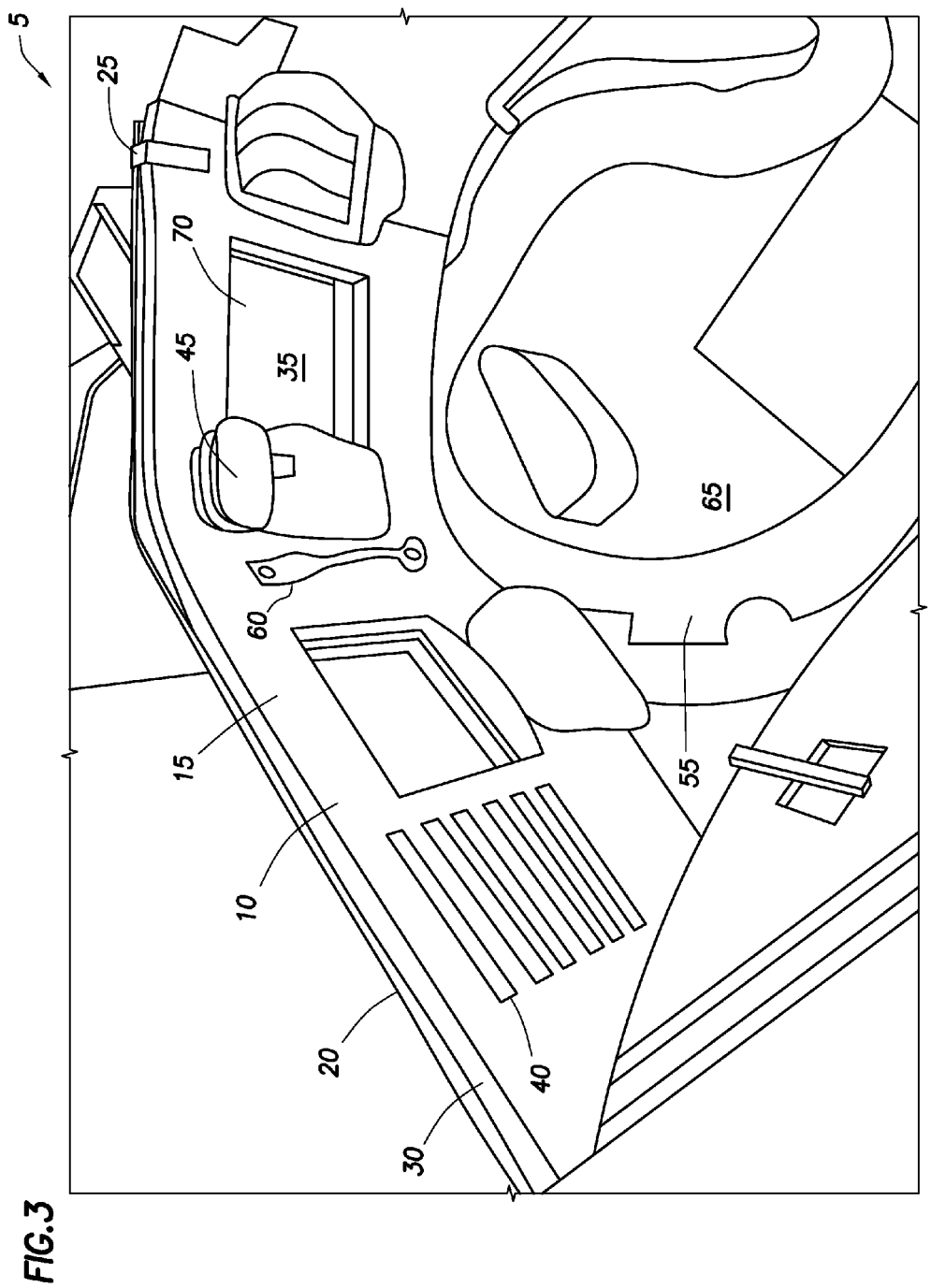
FIG. 3 illustrates a top perspective view of a portion of the personnel protection system shown in FIG. 1.

FIGS. 1, 2, and 3 illustrate an embodiment of a personnel protection system 5 installed in a protected firing platform 20. Embodiments of personnel protection system 5 provide flame resistant and anti-ballistic padded protection for personnel in protected firing platform 20. Other embodiments of personnel protection system 5 provide protection for personnel (i.e., a gunner) in protected firing platform 20 from potentially damaging contact against the sides of protected firing platform 20. For instance, without limitation, personnel protection system 5 provides protection to the ribs, head, and the like of personnel by providing a cushioned contact between the personnel and the sides of protected firing platform 20. Protected firing platform 20 may include any device that protects personnel in the performance of their duties. Such duties may include any duties carried out by personnel on a military vehicle such as, without limitation, firing a weapon. Without limitation, examples of protected firing platform 20 include turrets (i.e., gun turrets), cupolas, finials, or any other protective protrusions. In an embodiment, protected firing platform 20 is a turret. The military vehicle may be any type of military vehicle. Without limitation, military vehicles include land-borne military vehicles (i.e., armored personnel carriers, tanks, and the like), water-borne military vehicles (i.e., boats, ships, and the like), air-borne military vehicles (i.e., helicopters or planes). In some embodiments, the military vehicle is an armored personnel carrier. In an embodiment, the military vehicle is a LAV-25, which is commercially available from General Dynamics.

As shown in FIGS. 1, 2, and 3, personnel protection system 5 has blanket 10. Blanket 10 may have any desirable configuration. In an embodiment as illustrated in FIGS. 1, 2, and 3, blanket 10 has a configuration suitable for placement on protected firing platform 20. In embodiments as shown in FIGS. 1, 2, and 3, protected firing platform 20 is a turret, and blanket 10 is disposed about the interior sides of the turret. It is to be understood that the embodiments of FIGS. 1, 2, and 3 illustrate an embodiment in which protected firing platform 20 is a turret on a land-borne military vehicle. In some embodiments (not illustrated), configurations of blanket 10 are designed for the interiors of different protected firing platforms 20.

Figure 4:
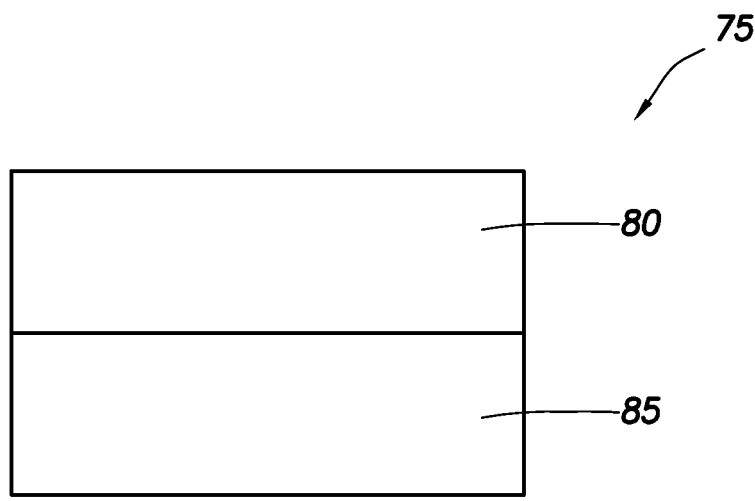
FIG. 4 illustrates an embodiment of a protective insert having a low velocity impact protection layer and a high velocity impact protection layer.

Blanket 10 includes carrier 15. Blanket 10 also has an interior (not illustrated) in which a protective insert 75 (illustrated in FIGS. 4, 5) may be disposed. Carrier 15 is an outer bag in which the interior of blanket 10 is disposed. Carrier 15 may be composed of any materials suitable for use in a military vehicle. In an embodiment, carrier 15 is composed of flame retardant and/or fluid resistant materials. Without limitation, the flame retardant materials provide further protection against explosive forces. In addition, without limitation, the fluid resistant materials protect the interior of carrier 15 and contents therein from fluids (i.e., the fluid resistant materials protect the protective insert 75 from potential damage from harmful fluids such as grease or oil). In some embodiments, carrier 15 is coated with flame retardant and/or fluid resistant materials. In embodiments, the interior of carrier 15 is accessible along carrier top portion 30. In an embodiment, the interior is accessible along any suitable portion of carrier top portion 30 to allow access to the interior and to allow desired inserts such as protective insert 75 (as shown in FIG. 4) to be inserted therein and/or removed therefrom. In embodiments, carrier 15 also has carrier closure means (not illustrated). In some embodiments, the carrier closure means is operable to open and close access to the interior of carrier 15. The carrier closure means includes any suitable means for closing an opening into the interior of carrier 15. Examples of suitable carrier closure means include buttons, clamps, zippers, and the like. In an embodiment, the carrier closure means is a zipper. Without limitation, a zipper facilitates an efficient method for opening and closing access to the interior of carrier 15. In some embodiments, blanket 10 is not openable and closeable. In such an embodiment, protective insert 75 is disposed within the interior of blanket 10 and any openings allowing access to the interior are closed during manufacture of blanket 10.

Protective insert 75 may include any type of insert suitable for protecting the personnel against contact with a part of the vehicle (i.e., a part of the protected firing platform 20). In embodiments, protective insert 75 is an energy attenuating padding. The energy attenuating padding may be any type of padding suitable for attenuating energy (i.e., energy from contact force). In an embodiment, the energy attenuating padding is foam padding. In embodiments, the energy attenuating padding has layers of different impact protection. In some embodiments, energy attenuating padding has a high velocity impact protection layer (i.e., configured for forces from a vehicle roll-over) and a low velocity impact protection layer (i.e., configured for forces from vibrations of the vehicle or from typical movement of the vehicle). The high velocity impact protection layer may provide protection against any high velocity contact of the personnel against protected firing platform 20, and the low velocity impact protection layer may provide protection against any low velocity contact of the personnel against protected firing platform 20. The high velocity impact protection layer may include contact of the personnel against protected firing platform 20 between about 100 ft/s and about 6,000 ft/s, and alternatively between about 50 ft/s and about 6,000 ft/s. The low velocity impact protection layer may include contact of the personnel against protected firing platform 20 between about 1 ft/s and about 50 ft/s, alternatively between about less than 1 ft/s to about more than 0 ft/s. In embodiments, the material for each of the layers may be different to provide the low velocity impact protection layer and the high velocity impact protection layer. In other embodiments in which protective insert 75 is foam padding, the densities of the foam padding of the high velocity impact protection layer and the low velocity impact protection layer may be different to provide the desired impact resistances. For instance, embodiments may include the low velocity impact protection layer having a lower density than the high velocity impact protection layer.

FIG. 4 illustrates an embodiment of protective insert 75 in which protective insert 75 has low velocity impact protection layer 80 and high velocity impact protection layer 85. In alternative embodiments (not illustrated), protective insert 75 has more than one low velocity impact protection layer 80 and/or more than one high velocity impact protection layer 85. In other alternative embodiments, protective insert 75 has a low velocity impact protection layer 80 or a high velocity impact protection layer 85. Low velocity impact protection layer 80 and high velocity impact protection layer 85 may have any desired thickness and configuration. Low velocity impact protection layer 80 and high velocity impact protection layer 85 may be disposed in any suitable order. In embodiments, low velocity impact protection layer 80 is disposed in a distal position to protected firing platform 20 with high velocity impact protection layer 85 disposed in the proximate position to protected firing platform 20 between low velocity impact protection layer 80 and protected firing platform 20.

Figure 5:
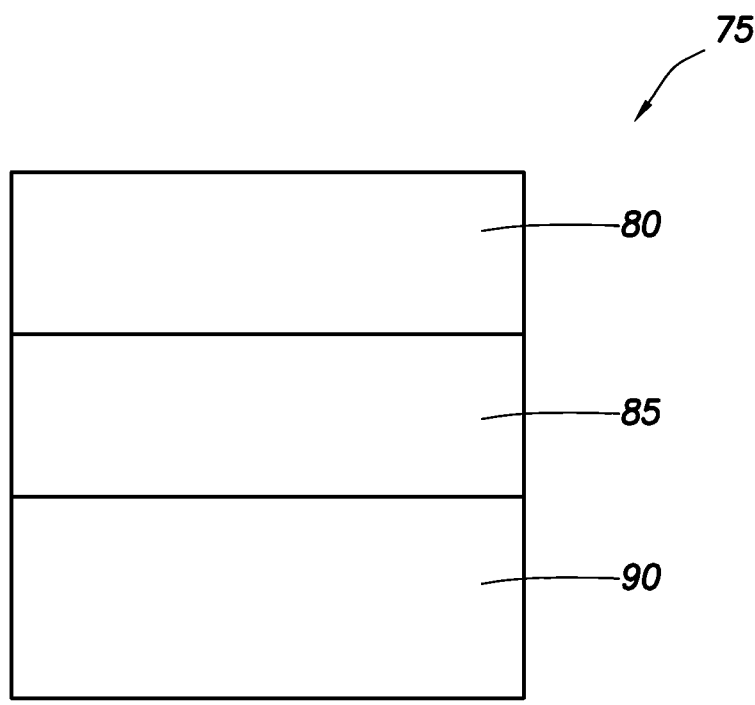
FIG. 5 illustrates an embodiment of a protective insert having a low velocity impact protection layer, a high velocity impact protection layer, and a ballistic layer.

FIG. 5 illustrates an embodiment of protective insert 75 in which protective insert 75 includes low velocity impact protection layer 80, high velocity impact protection layer 85 and ballistic layer 90. In other embodiments (not illustrated), protective insert 75 has more than one ballistic layer 90. Ballistic layer 90 may be disposed in any suitable order in relation to low velocity impact protection layer 80 and high velocity impact protection layer 85. In an embodiment, ballistic layer 90 is disposed proximate protected firing platform 20. Ballistic layer 90 includes any materials suitable for stopping or reducing the velocity of projectiles. In an embodiment, ballistic layer 90 includes aramid fibers. A commercial example of suitable materials includes KEVLAR® (a registered trademark of E.I. du Pont de Nemours and Company). In an embodiment, a portion or all of protective insert 75 is coated and/or covered in a fluid resistant material and/or a flame resistant material. Protective insert 75 may have any suitable configuration. In an embodiment, protective insert 75 has a configuration that is similar to that of the blanket 10 in which it is disposed. Without limitation, such an embodiment improves the protection capability of the blanket 10 as the similar configuration of the protective insert 75 maximizes protection within the configuration of the blanket 10. In some embodiments, protective insert 75 includes a protective insert connection means (not illustrated). The protective insert connection means includes any suitable means for attaching the protective insert 75 to a blanket 10 (i.e., by attachment with the protective insert connection means). For instance, examples of suitable protective insert connection means include buttons, clamps, a zipper, VELCRO®, and the like. It is to be understood that the protective insert 75 is not limited to the protective insert connection means but instead may be attached to a blanket 10 by any suitable means. In embodiments, protective insert 75 is attached to a blanket 10 by being sewn to the interior of a blanket 10.

Personnel protection system 5 may include any suitable means for attaching blanket 10 to the interior sides of protected firing platform 20. In embodiments as illustrated, personnel protection system 5 includes attachment devices 25. In embodiments, attachment devices 25 prevent carrier top portion 30 from hanging down when installed. Attachment devices 25 may be any suitable devices for attaching carrier top portion 30 to protected firing platform 20. Without limitation, examples of suitable attachment devices 25 include hooks, straps, clamps, and the like. In an embodiment, attachment devices 25 are clamps. In embodiments as illustrated, attachment devices 25 are disposed at sufficient intervals along carrier top portion 30 to prevent carrier top portion 30 from hanging down. In embodiments, securing means are used in addition to attachment devices 25 to secure blanket 10 to the interior of protected firing platform 20. Any suitable securing means may be used. In embodiments, the securing means includes securing blanket 10 to the interior of protected firing platform 20 by adhesive. Without limitation, a commercial example of a suitable adhesive is CB200, which is commercially available from Click Bond, Inc.

In an embodiment as illustrated, blanket 10 includes pockets 45. Blanket 10 may include any suitable number and type of pockets 45. In embodiments, pockets 45 are disposed at suitable locations on the sides of blanket 10. In some embodiments, pockets 45 are removeably attached to the sides of blanket 10.

In embodiments as shown, blanket 10 also includes molle strips 40. It is to be understood that molle strips 40 refer to a grid of webbing that is used to attach smaller equipment onto load bearing devices (i.e., the sides of blanket 10). In some embodiments, a pocket 45 may be attached to molle strips 40.

In an embodiment as illustrated, personnel protection system 5 also includes handles 60. Handles 60 are secured to blanket 10. In an embodiment, handles 60 are also secured to protected firing platform 20. Handles 60 may be secured by any suitable means. In embodiments, handles 60 are bolted or screwed to protected firing platform 20. In such embodiments, the bolts or screws pass through blanket 10 and into protected firing platform 20. Handles 60 may be composed of any suitable material. In an embodiment, handles 60 are composed of webbing. In some embodiments, handles 60 are coated with a suitable coating. In an embodiment, the coating is rubber. Without limitation, a handle 60 composed of webbing and coated with rubber may improve comfort and durability.

In some embodiments as shown, personnel protection system 5 includes fasteners 50. Fasteners 50 are secured to blanket 10 and are suitable for attaching objects to blanket 10. Fasteners 50 may include any suitable fastening devices for attaching objects to blanket 10. Without limitation, examples of suitable fastening devices include VELCRO® (a registered trademark of Velcro Industries B.V.) and the like. In such embodiments, one end of fastener 50 is secured to blanket 10, and the opposing end of fastener 50 has the VELCRO® for attachment purposes.

As shown, embodiments of personnel protection system 5 have hatch pad 55. Hatch pad 55 is disposed about entry 65. It is to be understood that in the embodiments of FIGS. 1, 2, and 3 protected firing platform 20 is a turret with hatch pad 55 being a turret hatch pad and entry 65 providing the entry to the turret. In embodiments, entry 65 is the entry from the body of the vehicle into protected firing platform 20. Hatch pad 55 is composed of any material suitable for cushioning contact of personnel (i.e., a gunner) with the sides of entry 65 when entering or leaving protected firing platform 20. Without limitation, hatch pad 55 protects the ribs, head, and the like of the personnel from such contact. Hatch pad 55 may be attached to entry 65 by any suitable means. In an embodiment, hatch pad 55 has an interior (not illustrated) that is configured to allow hatch pad 55 to be slid onto entry 65. In embodiments as shown, personnel protection system 5 has three hatch pads 55. It is to be understood that personnel protection system 5 is not limited to three hatch pads 55, but may have less than three or more than three hatch pads 55.

In further embodiments as shown, personnel protection system 5 has visual openings 35. Visual openings 35 are portions of personnel protection system 5 in which there are openings through blanket 10. In embodiments as shown, visual openings 35 are configured to correspond to the configuration of windows 70 of protected firing platform 20. In embodiments, a visual opening 35 is disposed proximate to a window 70. In an embodiment, the visual opening 35 allows the personnel (i.e., turret gunner) to see through the window 70.

In some embodiments of personnel protection system 5, carrier 15 includes reinforcement means (not illustrated). The reinforcement means are sewn into carrier 15. The reinforcement means may be any material suitable for improving protection of personnel in protected firing platform 20 against a blast. For instance, the reinforcement means provide added strength and further protection against blast fragments contacting carrier 15. In an embodiment, the reinforcement means include a fabric. In some embodiments, the reinforcement means include nylon fabric. In an embodiment, the reinforcement means are in the form of a web.

Although the present invention and its advantages have been described in detail, it should be understood that various changes, substitutions and alterations may be made herein without departing from the spirit and scope of the invention as defined by the appended claims.

What is claimed is:

1. A protected firing platform protection system, wherein the protected firing platform protection system is adapted for use with a protected firing platform of a military vehicle, comprising:
a blanket, wherein the blanket comprises a carrier and a selectively removable protective insert, wherein the selectively removable protective insert comprises energy attenuating padding and a ballistic layer, wherein the ballistic layer includes aramid fibers, wherein the energy attenuating padding comprises foam, wherein the carrier comprises an interior, wherein the selectively removable protective insert is disposed in the interior, wherein the blanket is capable of being attached to the protected firing platform, and wherein the protected firing platform is a turret, wherein the blanket further comprises a handle, wherein the handle comprises webbing and is coated with a rubber, and wherein the handle is bolted to the blanket.

2. The protected firing platform protection system of claim 1, wherein the energy attenuating padding comprises a high velocity impact protection layer and a low velocity impact protection layer.

3. The protected firing platform protection system of claim 2, wherein the high velocity impact protection layer is disposed between the low velocity impact protection layer and the protected firing platform.

4. The protected firing platform protection system of claim 1, wherein the ballistic layer is disposed proximate the protected firing platform.

5. The protected firing platform protection system of claim 1, wherein the carrier comprises a flame retardant material.

6. The protected firing platform protection system of claim 1, wherein the carrier comprises a fluid resistant material.

7. The protected firing platform protection system of claim 1, further comprising attachment devices, wherein the carrier comprises a carrier top portion, and further wherein the attachment devices attach the carrier top portion to the protected firing platform.

8. The protected firing platform protection system of claim 1, further comprising a pocket.

9. The protected firing platform protection system of claim 1, further comprising molle strips.

10. The protected firing platform protection system of claim 1, further comprising a handle.

11. The protected firing platform protection system of claim 1, further comprising reinforcement means.

12. The protected firing platform protection system of claim 11, wherein the reinforcement means comprises nylon fabric, and wherein the nylon fabric is in a web form.

13. The protected firing platform protection system of claim 1, further comprising a fastener.

14. A protected firing platform protection system, wherein the protected firing platform protection system is adapted for use with a protected firing platform of a military vehicle, comprising:

a blanket, wherein the blanket comprises a carrier and a removable protective insert, and wherein the carrier comprises an interior, and further wherein the removable protective insert is disposed in the interior, further wherein the blanket is capable of being attached to the protected firing platform, wherein the protected firing platform is a turret, wherein the blanket further comprising a visual opening, wherein the removable protective insert comprises energy attenuating padding and a ballistic layer, and wherein the removable protective insert is secured within the blanket with hook and loop fasteners, wherein the energy attenuating padding comprises foam, wherein the energy attenuating padding comprises a high velocity impact protection layer and a low velocity impact protection layer.

15. The protected firing platform of claim 14, wherein the protected firing platform comprises a hatch, and wherein the protected firing platform protection system further comprises a hatch pad.

16. The protected firing platform protection system of claim 14, wherein the military vehicle comprises a land-borne military vehicle, a water-borne military vehicle, or an air-borne military vehicle.

* * * * *